United States Patent
Devine, III et al.

(10) Patent No.: US 7,228,074 B2
(45) Date of Patent: Jun. 5, 2007

(54) INFRARED REPEATER SYSTEM, METHOD, AND ADJUSTABLE BRIGHTNESS EMITTER THEREFOR

(75) Inventors: William T. Devine, III, Freedom, NH (US); George G. Sands, Freedom, NH (US)

(73) Assignee: Audioplex Technology Incorporated, Melvin Village, NH (US)

( * ) Notice: Subject to any disclaimer, the term of this patent is extended or adjusted under 35 U.S.C. 154(b) by 680 days.

(21) Appl. No.: 10/629,135

(22) Filed: Jul. 29, 2003

(65) Prior Publication Data

US 2005/0025495 A1 Feb. 3, 2005

(51) Int. Cl.
*H04B 10/00* (2006.01)

(52) U.S. Cl. .............. 398/106; 398/112; 398/114; 398/136; 398/138

(58) Field of Classification Search .......... 398/115, 398/106, 112, 136, 114, 138
See application file for complete search history.

(56) References Cited

U.S. PATENT DOCUMENTS

| | | | |
|---|---|---|---|
| 4,264,982 A | 4/1981 | Sakarya | 455/603 |
| 4,509,211 A | 4/1985 | Robbins | 455/603 |
| 4,727,600 A * | 2/1988 | Avakian | 398/126 |
| 5,331,450 A | 7/1994 | Heep et al. | 359/135 |
| 5,383,044 A | 1/1995 | Borchardt et al. | 359/145 |
| 5,509,936 A | 4/1996 | Rappoport et al. | 623/27 |
| 5,602,664 A | 2/1997 | Doyle | 359/142 |
| 5,808,760 A | 9/1998 | Gfeller | 359/110 |
| 5,822,099 A * | 10/1998 | Takamatsu | 398/162 |
| 5,907,419 A | 5/1999 | Martnelli et al. | 359/172 |
| 5,926,301 A | 7/1999 | Hirt | 359/154 |
| 5,982,519 A | 11/1999 | Martnelli et al. | 359/154 |
| 6,111,677 A | 8/2000 | Shintani et al. | 359/142 |
| 6,175,434 B1 | 1/2001 | Feng | 359/152 |
| 6,222,660 B1 | 4/2001 | Traa | 359/189 |
| 6,304,347 B1 | 10/2001 | Beine et al. | 359/110 |
| 2002/0047624 A1 * | 4/2002 | Stam et al. | 315/291 |

* cited by examiner

*Primary Examiner*—Dalzid Singh
(74) *Attorney, Agent, or Firm*—McLane, Graf, Raulerson & Middleton, P.A.

(57) ABSTRACT

An IR emitter for use in an IR repeater system includes an IR light source and a manually adjustable brightness control for adjusting the brightness to a level appropriate for an IR detector of electronic equipment to be controlled. In a preferred aspect, the emitter includes a plug-type connector having a variable resistor mounted therein. Also provided is an IR repeater system and method employing an IR emitter having a manually adjustable brightness control.

12 Claims, 3 Drawing Sheets

INFRARED REPEATER SYSTEM, METHOD, AND ADJUSTABLE BRIGHTNESS EMITTER THEREFOR

FIELD OF THE INVENTION

The present invention relates to remote control systems for consumer electronic devices and, more specifically, to an adjustable brightness infrared (IR) emitter and method for use in connection with an IR repeater system. It is to be understood that the description of the invention herein is intended to be exemplary and explanatory only.

BACKGROUND OF THE INVENTION

Many consumer electronic devices may be controlled remotely via a wireless remote control unit. Such devices include, for example, television receivers, cable or satellite receiver boxes, video cassette recorders, digital video disc (DVD) players, audio equipment such as amplifiers, receivers, compact disc players, magnetic tape players, and the like.

Such devices may be operated remotely using handheld remote control units. Commonly, such remote control units transmit IR light signals representing coded electrical signals modulated on a carrier frequency in the range of about 36–40 kHz. The transmitted IR light signal is received by an IR receiver in the consumer electronic equipment, demodulated, decoded, and the appropriate action taken.

IR remote control units are line-of-sight devices. IR repeaters have been developed to allow users to exercise remote control of devices which are out of sight of the user, e.g., when the electronic equipment is hidden in a cabinet, remotely located from the user, e.g., in different rooms in a home, or otherwise located beyond the operational range of the hand held remote control unit.

An IR repeater includes an IR sensor or detector for detecting coded IR light signals produced by the remote control unit and producing an electrical signal representative of the incoming IR signal. Commonly, an IR receiver is electrically coupled to an IR transmitter and the electrical signal is passed thereto. The IR transmitter generates an IR light signal which reproduces the original IR light signal received by the IR receiver. The consumer electronic equipment receives this IR light signal from the IR transmitter and performs the selected function. The IR detector is located where it can receive the IR light signals from the remote control unit. The IR transmitter includes an IR light emitter which is placed such that emitted light will impinge upon the IR detector of the device to be controlled, and is typically mounted directly adjacent thereto.

However, it has been discovered that the IR receivers of many consumer electronic devices are too sensitive for mounting existing IR emitters in adjacent relation thereto. Accordingly, the present invention provides a new and improved IR repeater system, emitter, and method that overcome the above-referenced problems and others.

SUMMARY OF THE INVENTION

In a first aspect, an IR emitter of a type for use with an IR repeater system comprises an IR light source and a manually adjustable brightness control.

In another aspect, an IR repeater system includes an IR detector for detecting an IR light signal and generating an electrical signal in response thereto and a transmitter coupled to the IR detector for generating an output IR signal. An IR emitter electrically coupled to the transmitter for emitting an IR light signal includes an IR light source and a manually adjustable brightness control.

In a further aspect, a method for effecting control of an electronic device comprises operating a remote control device to generate a first IR control signal and receiving the first IR control signal at an IR detector located remotely from the electronic device. A second IR control signal, which substantially replicates the first IR control signal, is produced in response to the first IR control signal to drive an IR emitter having a manually adjustable brightness control. It is determined whether IR emitter has an appropriate brightness level for the IR receiver of the electronic device, e.g., via the detection of transmission errors, if the IR emitter does not have an appropriate brightness level for the IR receiver of the electronic device, the brightness level of the IR emitter is manually adjusted.

BRIEF DESCRIPTION OF THE DRAWINGS

The accompanying drawings, which are incorporated in and constitute a part of the specification, illustrate embodiments of the invention and together with the description of the invention herein, serve to explain the principles of the invention.

DETAILED DESCRIPTION OF THE PREFERRED EMBODIMENT

Figure 1:
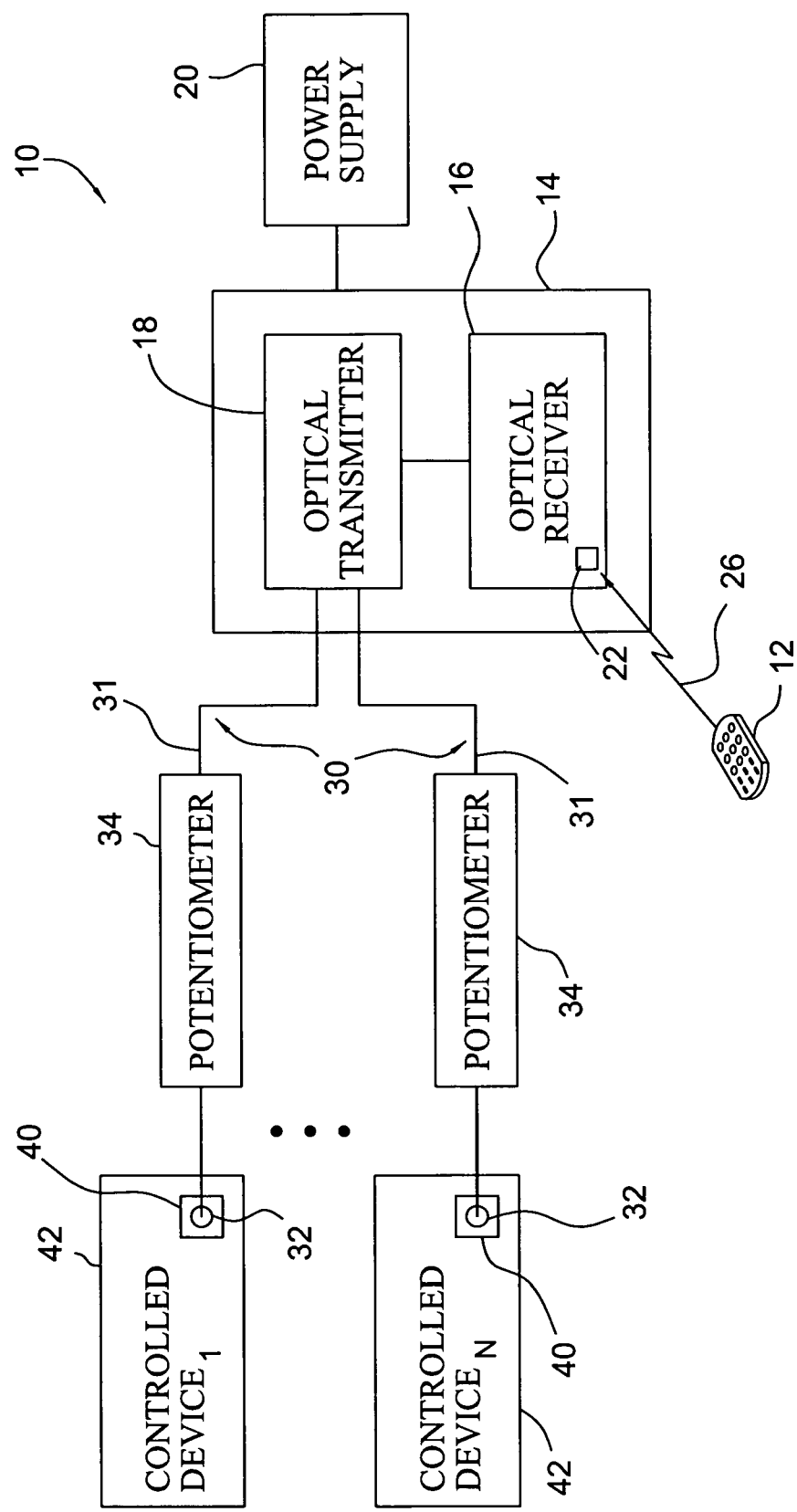
FIGS. 1 and 2 are functional block diagrams illustrating a exemplary remote control systems including the IR emitter with adjustable brightness according to the present invention.

FIG. 1 illustrates an IR repeater system 10 according to an exemplary embodiment of the present invention. The system 10 may be operated with a remote control unit 12, such as a hand-held remote control unit, and includes an IR repeater or extender unit 14. The unit 14 includes an optical receiver 16 and an optical transmitter 18, and operates using a power supply 20, which may be for example a battery, or a DC power source, e.g., connected to an electric power mains.

The optical receiver 16 includes at least one detector 22, such as a photodiode, phototransistor, or the like. The optical receiver 16 receives an incoming IR optical signal 26 and converts it to an electrical signal representative of the incoming signal 26. The electrical signal is passed to an optical transmitter 18 which drives one or more, up to N, IR emitters 30, wherein N is an integer, via a transmission line 31 to produce an optical signal which substantially replicates the original signal. As used herein, the term "substantial" is intended to encompasses minor variations between the original signal and the repeated signal as would not affect the ability to control a device to be controlled 42, including slight mistuning due to small differences in the carrier frequency and other differences.

The IR emitter 30 includes an IR light emitting device such as an IR light emitting diode (LED) or other IR light source 32, preferably in a housing or enclosure which is positioned in proximity to an IR receiver 40 of a device 42 to be controlled. Preferably, the LED or other IR source 32 is mounted or secured directly over the receiver 40, e.g., via an fastener, such as a clip, adhesive, or other fastener.

The emitter 30 further includes a variable resistor 34 electrically connected to the source 32 for adjusting the brightness of the source 32 to a level appropriate for the receiver 40 of the particular device 42 being controlled. In operation, an inappropriate brightness level can be determined by transmission errors, e.g., identified when the controlled equipment fails to properly respond in response to a transmitted control signal. In this manner, errors resulting from an inappropriate brightness level can be avoided and transmission errors minimized or eliminated. For example, in the case of oversaturation of the receiver 40, the variable resistor 34 can be manually adjusted to reduce the current level supplied to the IR source during emission.

Figure 2:
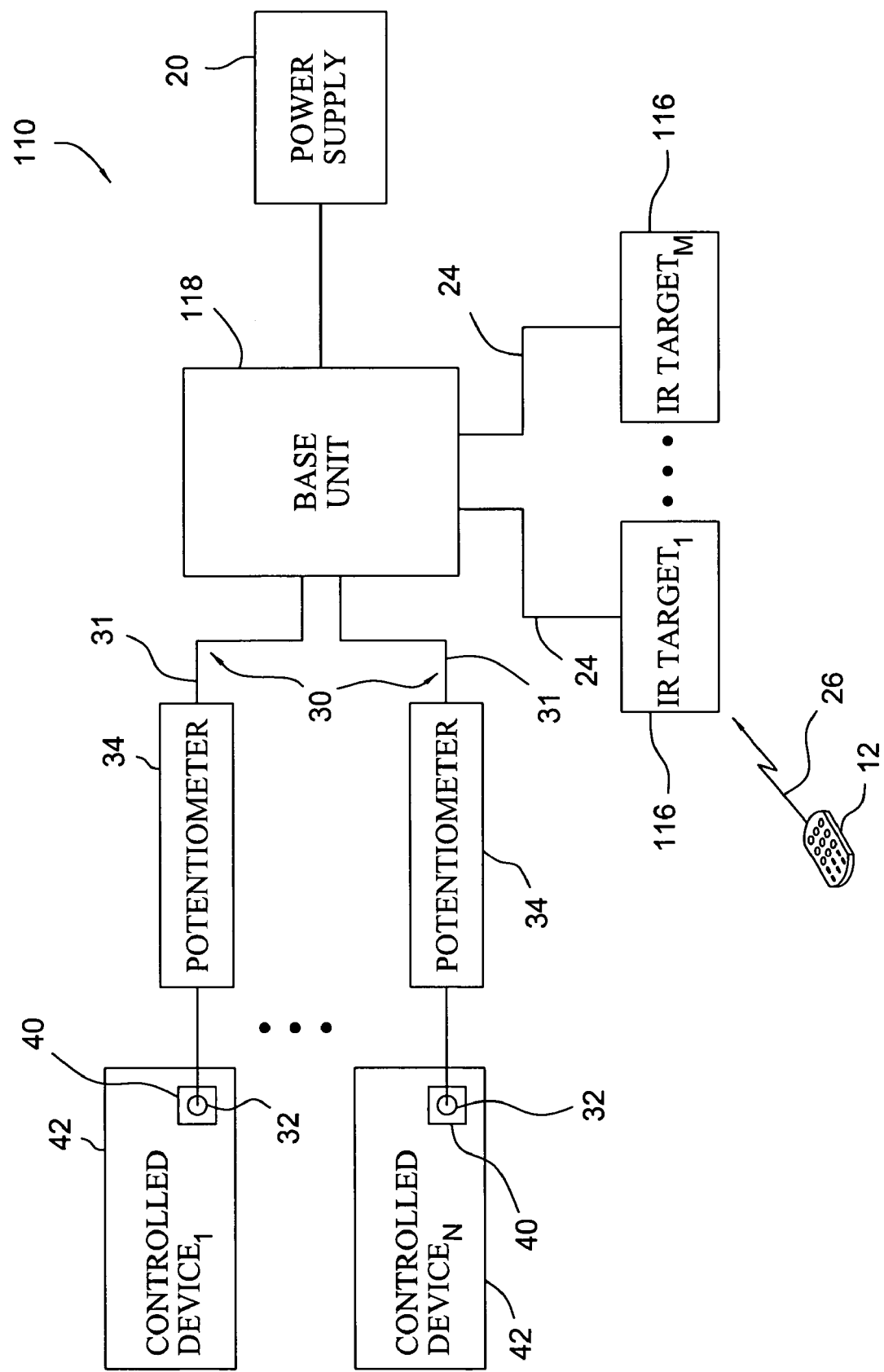

Referring now to FIG. 2, there is shown an IR repeater system 110 according to a further exemplary embodiment of the present invention. The system 110 may be operated with a remote control unit 12 and operates using a power supply 20.

At least one, and up to M, IR targets 116, where M is any integer, are electrically coupled to a base unit 118 via lines 24, thereby allowing the targets 116 to be placed at one more desired locations remote from the base unit 118, which may be placed at a central location. However, one or more IR sensors integral with the base unit 118 are also contemplated.

The IR targets 116 include an IR photosensor, such as photodiode, phototransistor, or the like. The targets 116 receive an incoming IR optical signal 26 and convert it to an electrical signal representative of the incoming signal 26. The electrical signal is passed to the base unit 118 which drives one or more IR emitters 30 comprising an IR source 32, such as an IR LED, and a potentiometer 34 electrically coupled to the base unit 118 via a transmission line 31.

The IR light source 32 is preferably mounted in a housing or enclosure which is adapted to be positioned in proximity to an IR receiver 40 or a device 42 to be controlled. Preferably, the emitter 32 is mounted, e.g., via an adhesive or mechanical fastener, directly over the receiver 40 portion of the device 42. The emitter 30 further includes a variable resistor 34 electrically coupled to the source 32 for adjusting the brightness of the emitter 32 to a level appropriate for the receiver 40 of the particular device 42 being controlled, thereby avoiding transmission errors due to oversaturation of the receiver 40.

Referring now to FIGS. 1 and 2, it will be recognized that the optical signal may be received and transmitted by a number of methods. For example, in some instances, the current produced by the photosensor may simply be amplified and supplied to the IR emitter such that the modulated signal is retransmitted directly. Alternatively, the IR receiver may include a demodulator which produces a demodulated signal which can be used to switch an oscillator on and off, the oscillator having a frequency at or near that of the carrier frequency of the remote control unit 12. The output of the oscillator can then be passed to the IR transmitter circuitry to drive the emitters 32.

Figure 3:
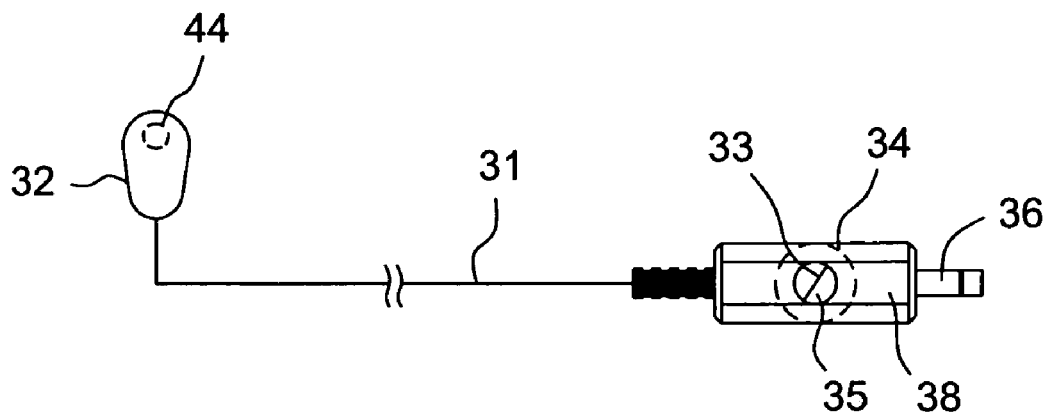
FIG. 3 illustrates an adjustable brightness IR emitter according to a first embodiment of the present invention.

FIG. 3 illustrates an exemplary IR emitter 30 in accordance with a first embodiment of the present invention comprising an IR source 44, such as an IR LED, mounted in a housing 32. The source 44 is electrically connected to transmission circuitry (see, e.g., FIGS. 1 and 2) via a transmission line 31, which may be a two-conductor wire. The line 31 terminates in a plug-in connector 36, such as a standard monaural phone plug, preferably a one-eighth-inch phone plug, which may be received in a complimentary jack electrically connected to the optical transmission or driving circuitry of an IR repeater. The connector 36 is preferably of a standard connector type, such as RC- or phono-type connectors, or any other size or type of electrical connector.

The connector 36 includes a housing 38 enclosing a potentiometer 34 electrically connected to the emitter 44, e.g., in series circuit arrangement therewith, for controlling the level of the current flowing thereto. In the depicted embodiment the potentiometer 34 includes a rotatable shaft 35 which can be rotated to control the amount of current which flows to the LED 44, although sliding and other types of variable resistors are contemplated as well. Preferably, the shaft 35 is flush with the housing 38 so as to prevent inadvertent rotation of the shaft 35, e.g., during handling, and preferably includes a slot 33 or other recess or surface feature allowing rotational adjustment with a complimentary tool.

Figure 4:
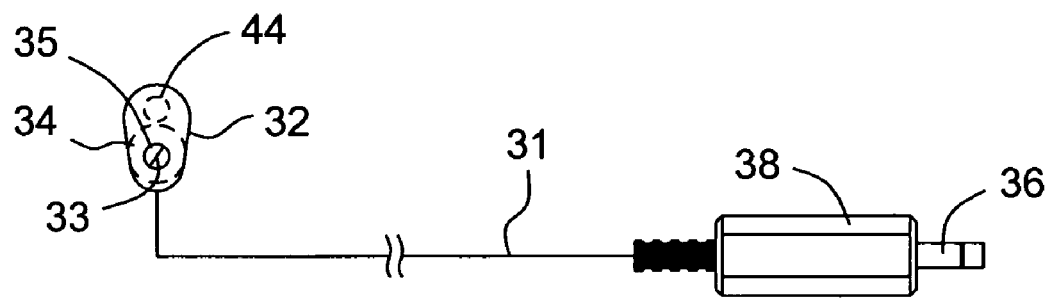
FIG. 4 illustrates an adjustable brightness IR emitter according to a second embodiment of the present invention.

With reference now to FIG. 4, there appears an alternative exemplary IR emitter 30 in accordance with a second embodiment of the present invention comprising an LED or other IR source 44 mounted in a housing 32 adapted to be mounted on a device 42 to be controlled. The emitter 44 is electrically connected to transmission circuitry via a transmission line 31 which, in the depicted embodiment, terminates in a plug-in connector 36, as described above by way of reference to FIG. 3. However, it will be recognized that a plug-type electrical connector (36, 38) may be omitted in the FIG. 4 embodiment and that the emitter 30 may alternatively be provided with wire leads which may be electrically coupled to the transmitter via any method for connecting cables without using plugs, including screw terminals, barrier strips, spring-loaded terminals for accepting bare wire leads, or other connector, and which may be, for example, an end user-supplied connector.

A potentiometer 34 is enclosed in the emitter housing 32 and connected in series with the emitter 44. Again, the potentiometer 34 includes a rotatable shaft 35 for controlling the amount of current which flows to the LED 44, although sliding and other types of variable resistors are also contemplated. Preferably, the shaft 35 is flush with the housing 32 so as to prevent inadvertent rotation of the shaft 35 and preferably includes a slot 33 for rotational adjustment.

Figure 5:
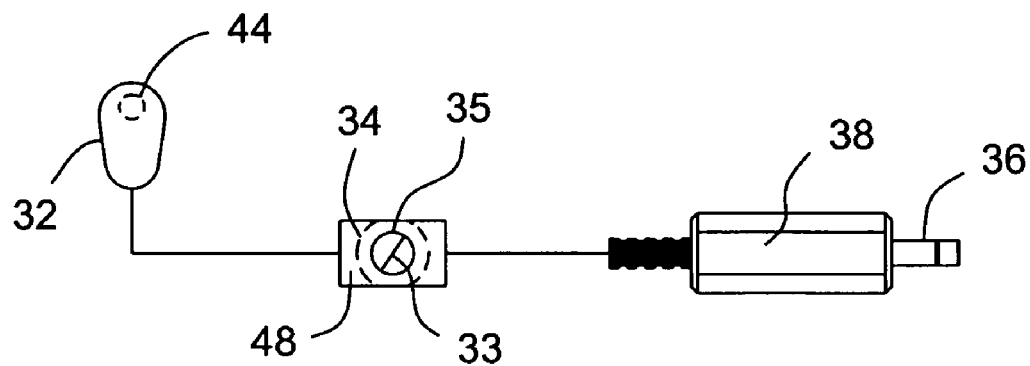
FIG. 5 illustrates an adjustable brightness IR emitter according to a second embodiment of the present invention.

With reference now to FIG. 5, there appears an further alternative exemplary IR emitter 30 in accordance with a third embodiment of the present invention comprising an LED or other IR emitter 44 mounted in a housing 32. The emitter 44 is electrically connected to transmission circuitry via a transmission line 31 which terminates in a plug-in connector 36 as described above.

A potentiometer 34 is enclosed within a housing 38 along the transmission line 31 and is connected in series with the emitter 44. The potentiometer 34 includes a rotatable shaft 35 for controlling the amount of current which flows to the LED 44, although sliding and other types of variable resistors are also contemplated. Preferably, the shaft 35 is flush with the housing 32 to prevent inadvertent rotation of the shaft 35 and preferably includes a slot 33 as described above. Again, the depicted plug-type electrical connector (36, 38) may be omitted in the FIG. 5 embodiment and the emitter 30 may alternatively be provided with wire leads which may be electrically coupled to the transmitter via any method for connecting cables or bare wire leads without using plugs, such as described above by way of reference to FIG. 4.

The invention has been described with reference to the preferred embodiment. Modifications and alterations will occur to others upon a reading and understanding of the preceding detailed description. It is intended that the invention be construed as including all such modifications and alterations.

Having thus described the preferred embodiments, the invention is now claimed to be:

1. An IR repeater system comprising:
   an IR detector for detecting an IR light signal and generating an electrical signal in response thereto;
   a transmitter coupled to the IR detector for generating an output IR signal;
   a IR emitter electrically coupled to the transmitter for emitting an IR light signal, said IR emitter comprising an IR light source and a manually adjustable brightness control;
   said IR emitter further including a connector plug for removably connecting the IR emitter to said transmitter, said connector plug having a housing; and
   said manually adjustable brightness control including a variable resistor electrically coupled to the IR light source and received within said housing, the variable resistor having a rotatable shaft for adjusting the resistance of said variable resistor extending at least partially through an aperture in said housing.

2. The IR repeater system of claim 1, wherein said IR light signal represents a coded signal modulated by a modulating signal and further comprising a receiver for receiving said coded signal.

3. The IR repeater system of claim 1 wherein said IR light source is an LED.

4. The IR repeater system of claim 1, wherein said IR detector is located remotely with respect to said IR emitter.

5. The IR repeater system of claim 1, wherein the connector plug comprises a ⅛-*inch* monaural *plug*.

6. The IR repeater system of claim 1, wherein the variable resistor and the IR light source are connected in series.

7. The IR repeater system of claim 1, wherein the IR light source comprises an LED mounted in a housing adapted to be attached directly over an IR detector of a device to be controlled.

8. An IR repeater system comprising:
   an IR detector for detecting an IR light signal and generating an electrical signal in response thereto;
   a transmitter coupled to the IR detector for generating an output IR signal;
   a IR emitter electrically coupled to the transmitter for emitting an IR light signal, said IR emitter comprising a housing, an IR source, and a manually adjustable brightness control;
   said manually adjustable brightness control including a variable resistor electrically coupled to the IR light source and contained within said housing; and
   said variable resistor having a rotatable shaft for adjusting the resistance of the variable resistor extending at least partially through an aperture in said housing.

9. The IR repeater system of claim 8, wherein the IR emitter comprises a pair of wire leads.

10. The IR repeater system of claim 8, wherein the said IR light source is an LED.

11. The IR repeater system of claim 8, wherein the housing is adapted to be attached directly over an IR detector of a device to be controlled.

12. In an IR repeater system of a type comprising an infrared receiver for receiving an incoming IR signal and an infrared transmitter for transmitting a substantial replica of the incoming IR signal, an IR emitter comprising:
   an IR light source and a manually adjustable brightness control including a housing and a variable resistor electrically coupled to the IR light source and received within said housing, the variable resistor having a rotatable shaft for adjusting the resistance of said variable resistor extending at least partially through an aperture in said housing.

\* \* \* \* \*